United States Patent
Bewick et al.

(10) Patent No.: US 9,713,222 B2
(45) Date of Patent: Jul. 18, 2017

(54) SYSTEM AND METHOD FOR CONTROLLING A PLURALITY OF LIGHT FIXTURE OUTPUTS

(71) Applicant: Electronic Theatre Controls, Inc., Middleton, WI (US)

(72) Inventors: Gary Bewick, Cross Plains, WI (US); Joshua Jordan, Madison, WI (US); Timothy G. Robbins, Dane, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 15/270,782

(22) Filed: Sep. 20, 2016

(65) Prior Publication Data

US 2017/0013692 A1    Jan. 12, 2017

Related U.S. Application Data

(63) Continuation-in-part of application No. 14/858,757, filed on Sep. 18, 2015, now Pat. No. 9,451,668, which
(Continued)

(51) Int. Cl.
*G06F 1/00* (2006.01)
*H05B 33/08* (2006.01)
(Continued)

(52) U.S. Cl.
CPC ..... *H05B 33/0866* (2013.01); *H05B 33/0848* (2013.01); *H05B 33/0851* (2013.01);
(Continued)

(58) Field of Classification Search
USPC ... 315/185 R, 192, 291, 294, 297, 299, 307, 315/308, 312
See application file for complete search history.

(56) References Cited

U.S. PATENT DOCUMENTS

| 7,498,753 B2 * | 3/2009 | McAvoy | H05B 33/086 315/158 |
| 7,868,562 B2 | 1/2011 | Salsbury et al. | |

(Continued)

OTHER PUBLICATIONS

International Search Report for Application No. PCT/US2015/039862 dated Sep. 11, 2015 (4 pages).
(Continued)

*Primary Examiner* — Douglas W Owens
*Assistant Examiner* — Jianzi Chen
(74) *Attorney, Agent, or Firm* — Michael Best & Friedrich LLP

(57) ABSTRACT

A method of controlling a plurality of light fixtures. The method includes determining first light outputs for each of the plurality of light fixtures. The method also includes determining a first spectrum of light reflected off of a surface. The method further includes determining a first difference between the first light outputs and desired light outputs for each of the plurality of light fixtures. The method also includes determining a second difference between the first spectrum of light reflected off of the surface and a desired spectrum of light reflected off of the surface. The method further includes calculating an updated output spectrum for the plurality of light fixtures based at least in part on the first difference and the second difference. The method also includes determining a second set of light source output values based at least in part on the updated output spectrum.

20 Claims, 10 Drawing Sheets

Related U.S. Application Data is a continuation of application No. 14/457,644, filed on Aug. 12, 2014, now Pat. No. 9,144,140.

(51) Int. Cl.
*H05B 37/02* (2006.01)
*H05B 39/04* (2006.01)

(52) U.S. Cl.
CPC ..... *H05B 33/0869* (2013.01); *H05B 33/0872* (2013.01); *H05B 37/0218* (2013.01); *H05B 37/0227* (2013.01); *H05B 39/042* (2013.01)

(56) References Cited

U.S. PATENT DOCUMENTS

| | | | |
|---|---|---|---|
| 7,994,732 B2 | 8/2011 | Zulch | |
| 3,021,921 A1 | 9/2011 | Paolini | |
| 8,330,392 B2 | 12/2012 | Zulch | |
| 8,497,871 B2 | 7/2013 | Zulch | |
| 3,508,730 A1 | 8/2013 | Hempson et al. | |
| 8,665,296 B2 | 3/2014 | Zulch | |
| 8,836,243 B2 * | 9/2014 | Eisele | H05B 33/0857 315/152 |
| 2010/0148677 A1 * | 6/2010 | Melanson | H05B 33/0869 315/154 |
| 2012/0038280 A1 * | 2/2012 | Zoorob | F21K 9/00 315/151 |
| 2012/0235600 A1 * | 9/2012 | Simonian | H05B 37/0209 315/312 |
| 2012/0307243 A1 | 12/2012 | Elliott | |
| 2013/0307419 A1 * | 11/2013 | Simonian | H05B 33/0872 315/153 |
| 2014/0175986 A1 | 6/2014 | Adenau et al. | |

OTHER PUBLICATIONS

Written Opinion from the International Searching Authority for Application No. PCT/US2015/039862 dated Sep. 11, 2015 (6 pages).

Wikipedia Article, "Color Rendering Indes," http://en.wikipedia.org/wiki/Color_rendering_index, Modified Aug. 2, 2014 (12 pages).

* cited by examiner

SYSTEM AND METHOD FOR CONTROLLING A PLURALITY OF LIGHT FIXTURE OUTPUTS

CROSS-REFERENCE TO RELATED APPLICATIONS

This application is a continuation-in-part of U.S. patent application Ser. No. 14/858,757, filed Sep. 18, 2015, now U.S. Pat. No. 9,451,668, which is a continuation of U.S. patent application Ser. No. 14/457,644, filed Aug. 12, 2014, now U.S. Pat. No. 9,144,140, the entire contents of which is incorporated herein by reference.

BACKGROUND

This disclosure relates to controlling an output of a light fixture.

Among a plurality of light fixtures, each light fixture may generate a slightly different light output than the other light fixtures. Different light fixtures generate different light outputs for a variety of reasons. For example, one light fixture may include incandescent light sources and use gels to generate outputs of different colors, another light fixture may include four light-emitting diode ("LED") light sources, and a third light fixture may include seven LED light sources. Each of the light fixtures may be capable of producing outputs that are similar to one another, but different control settings may be required for each lighting fixture in order to produce a desired, consistent output among the light fixtures.

Additionally, as light sources age, the color output or color and the brightness of the light sources can be adversely affected. For example, as LEDs age, the brightness of the output generated for a given input setting may be lower than it was when the LEDs were new. These and other issues can adversely affect the appearance of the light produced by an individual light source or individual light fixture. Light sources or light fixtures that are only calibrated for color bin variances at the time of manufacturing are not compensated for these changes that occur over time.

SUMMARY

The above concerns are compounded when multiple light fixtures are implemented in the same venue and each light fixture may be generating a slightly or significantly different light output. Particular applications, such as theatre lighting which is highly sensitive to the manner in which light reflects off surfaces, are highly sensitive to inconsistencies in light output from both individual and plural light fixtures. In order to ensure that a lighting system is able to accurately and consistently produce a desired light output from venue to venue, the light fixtures within the system should be compensated for differences in light output among different light fixtures (e.g., due to age, type of fixture, etc.), as well as and based on light from the light fixtures that is reflected of one or more surfaces within the venue. As such, the disclosure provides systems and methods for controlling an output of a plurality of light fixtures of varying types such that the outputs of the light fixtures are consistent among the light fixtures and in order to produce the desired reflection of light off of a surface.

In one implementation, the disclosure provides a method of controlling a plurality of light fixtures. The method includes detecting a first light output of a first light fixture, detecting a second light output of a second light fixture, and detecting a first reflection of light from a surface. The first light output has a first output color and a first output brightness. The first output color has a first output spectrum. The second light output has a second output color and a second output brightness. The second output color has a second output spectrum. The first reflection of light corresponds to light from the first light fixture and the second light fixture that is reflected off of the surface. The method also includes analyzing the first light output to determine the first output color and the first output brightness, analyzing the second light output to determine the second output color and the second output brightness, and analyzing the first reflection of light to determine a spectrum of the light reflected off of the surface. The first light output is then compared to the second light output to determine a difference in color between the first light output and the second light output, the first output brightness is compared to the second output brightness to determine a difference in brightness between the first output brightness and the second output brightness, and the first reflection of light from the surface is compared to a desired reflection of light from the surface to determine a difference between the spectrum of the light reflected off of the surface and a desired spectrum of the light reflected off of light from the surface.

The method can also include calculating, when a difference in color between the first light output and the second light output is identified, an updated output color of at least one of the first light fixture and the second light fixture such that the output color of the first light output of the first light fixture substantially matches the output color of the second light output of the second light fixture. When a difference in brightness between the first output brightness and the second output brightness is identified, an updated output brightness for at least one of the first light fixture and the second light fixture is then calculated such that the output brightness of the first light output of the first light fixture substantially matches the output brightness of the second light output of the second light fixture. When a difference in the spectrum of the light reflected off of the surface and a desired spectrum of the light reflected off of the surface is identified, an updated output spectrum for at least one of the first light fixture and the second light fixture is calculated such that the first output spectrum substantially matches the second output spectrum without further changing the first output color, the second output color, the first output brightness, or the second output brightness. The method also includes determining a respective light source output value for each of the light sources in each of the first light fixture and the second light fixture such that the first output color substantially matches the second output color, the first output spectrum substantially matches the second output spectrum, and the first output brightness substantially matches the second output brightness. Each of the light sources in each of the first light fixture and the second light fixture is then driven at the respective light source output value.

In another implementation, the disclosure provides a system for controlling the output of a plurality of light fixtures. The system includes a first light fixture including four or more light sources, a second light fixture including four or more light sources, a sensing module, and a controller. The sensing module is configured to detect a first light output of the first light fixture, detect a second light output of the second light fixture, and detect a first reflection of light from a surface. The first light output has a first output color and a first output brightness. The first output color has a first output spectrum. The second light output has a second output color and a second output brightness. The second output color has a second output spectrum. The first reflection of light corresponds to light from the first light fixture and the second light fixture that is reflected off of the surface. The controller is configured to analyze the first light output to determine the first output color and the first output brightness, analyze the second light output to determine the second output color and the second output brightness, analyze the first reflection of light to determine a spectrum of the light reflected off of the surface, compare the first light output to the second light output to determine a difference in color between the first output color and the second output color, compare the first output brightness to the second output brightness to determine a difference in brightness between the first output brightness and the second output brightness, and compare the first reflection of light from the surface to a desired reflection of light from the surface to determine a difference between the spectrum of the light reflected off of the surface and a desired spectrum of the light reflected off of light from the surface.

The controller can also be configured to calculate an updated output color of at least one of the first light fixture and the second light fixture when a difference in color between the first light output and the second light output is identified such that the output color of the first light output of the first light fixture substantially matches the output color of the second light output of the second light fixture, calculate an updated output brightness for at least one of the first light fixture and the second light fixture when a difference in brightness between the first output brightness and the second output brightness is identified such that the output brightness of the first light output of the first light fixture substantially matches the output brightness of the second light output of the second light fixture, and calculate an updated output spectrum for at least one of the first light fixture and the second light fixture when a difference in the spectrum of the light reflected off of the surface and a desired spectrum of the light reflected off of light from the surface is identified such that the first output spectrum substantially matches the second output spectrum without further substantial change to the first output color, the second output color, the first output brightness, or the second output brightness. The controller then determines a respective light source output value for each of the four or more light sources in each of the first light fixture and the second light fixture such that the first output color substantially matches the second output color, the first output spectrum substantially matches the second output spectrum, and the first output brightness substantially matches the second output brightness. The controller then drives each of the four or more light sources in each of the first light fixture and the second light fixture at the respective light source output value.

In another implementation, the disclosure provides a method of controlling a plurality of light fixtures. The method includes driving light sources in each of the plurality of light fixtures at a first set of light source output values. The method also includes determining first light outputs for each of the plurality of light fixtures. Each of the first light outputs includes a first output spectrum. The method further includes determining a first spectrum of light reflected off of a surface. The light reflected off of the surface corresponds to light from the plurality of light fixtures. The method also includes determining a first difference between the first light outputs and desired light outputs for each of the plurality of light fixtures. The method further includes determining a second difference between the first spectrum of light reflected off of the surface and a desired spectrum of light reflected off of the surface. The method also includes calculating an updated output spectrum for the plurality of light fixtures based at least in part on the first difference and the second difference. The method further includes determining a second set of light source output values based at least in part on the updated output spectrum. The method also includes driving the light sources in each of the plurality of light fixtures at the second set of light source output values.

In another implementation, the disclosure provides a lighting system. The lighting system includes a plurality of light fixtures and a controller. Each of the plurality of light fixtures including a plurality of light sources. The controller is configured to drive the plurality of light sources in each of the plurality of light fixtures at a first set of light source output values. The controller is also configured to determine first light outputs for each of the plurality of light fixtures. Each of the first light outputs includes a first output spectrum. The controller is further configured to determine a first spectrum of light reflected off of a surface. The light reflected off of the surface corresponds to light from the plurality of light fixtures. The controller is also configured to determine a first difference between the first light outputs and desired light outputs for each of the plurality of light fixtures. The controller is further configured to determine a second difference between the first spectrum of light reflected off of the surface and a desired spectrum of light reflected off of the surface. The controller is also configured to calculate an updated output spectrum for the plurality of light fixtures based at least in part on the first difference and the second difference. The controller is further configured to determine a second set of light source output values based at least in part on the updated output spectrum. The controller is also configured to drive the plurality of light sources in each of the plurality of light fixtures at the second set of light source output values.

In another implementation, the disclosure provides a controller for a lighting system. The controller includes an electronic processor and a computer readable medium. The computer readable medium includes executable instructions that are capable of being retrieved from the computer readable medium and executed by the electronic processor. The executable instructions cause the controller to drive light sources in each of a plurality of light fixtures at a first set of light source output values. The executable instructions also cause the controller to determine first light outputs for each of the plurality of light fixtures. Each of the first light outputs includes a first output spectrum. The executable instructions further cause the controller to determine a first spectrum of light reflected off of a surface. The light reflected off of the surface corresponds to light from the plurality of light fixtures. The executable instructions also cause the controller to determine a first difference between the first light outputs and desired light outputs for each of the plurality of light fixtures. The executable instructions further cause the controller to determine a second difference between the first spectrum of light reflected off of the surface and a desired spectrum of light reflected off of the surface. The executable instructions also cause the controller to calculate an updated output spectrum for the plurality of light fixtures based at least in part on the first difference and the second difference. The executable instructions further cause the controller to determine a second set of light source output values based at least in part on the updated output spectrum. The executable instructions also cause the controller to drive the light sources in each of the plurality of light fixtures at the second set of light source output values.

Other aspects of the disclosure will become apparent by consideration of the detailed description and accompanying drawings.

DETAILED DESCRIPTION

Figure 1:
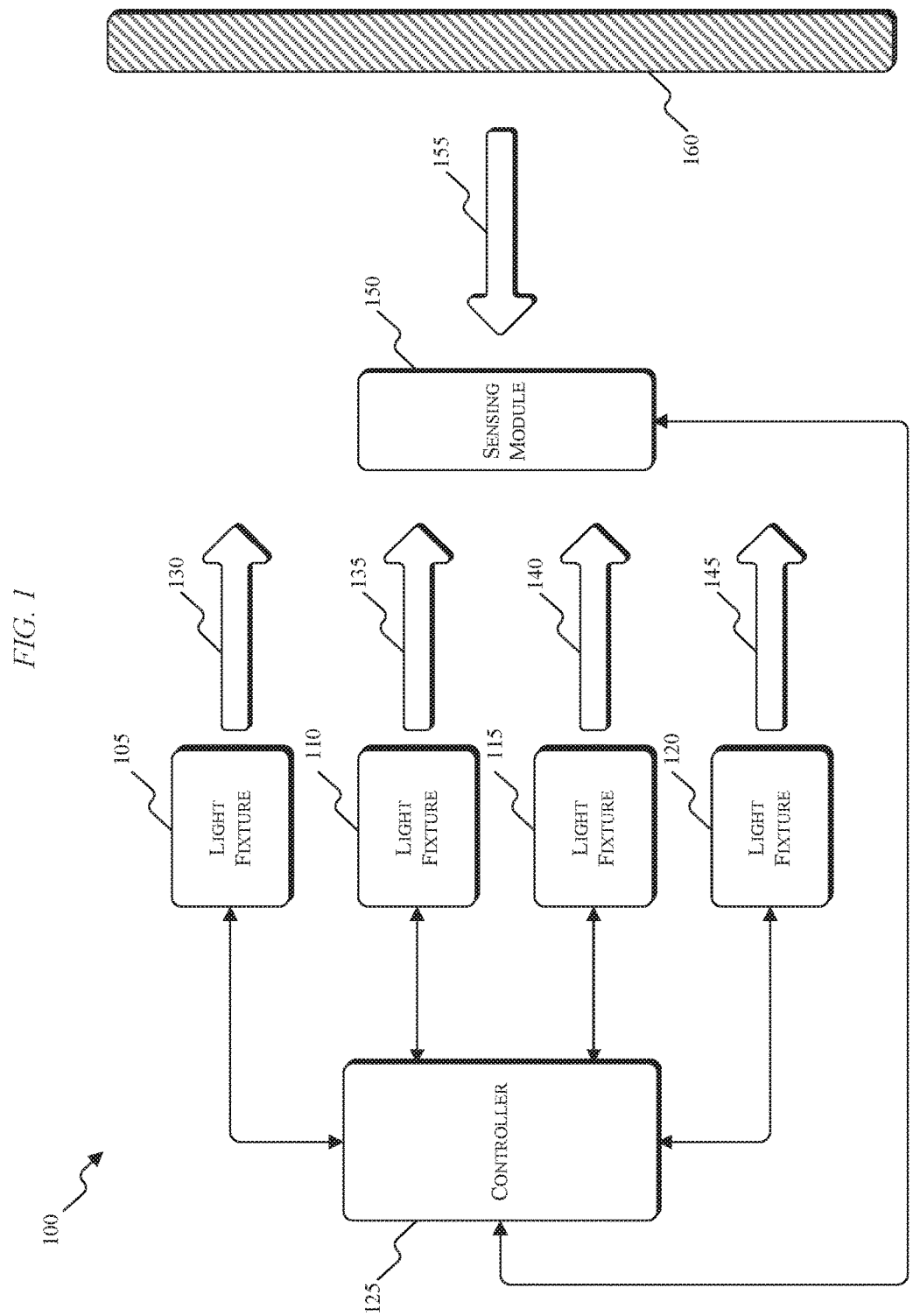
FIG. 1 illustrates a lighting system according to an implementation of the disclosure.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the disclosure. Furthermore, and as described in subsequent paragraphs, the specific configurations illustrated in the drawings are intended to exemplify implementations of the invention and that other alternative configurations are possible. The terms "processor," "central processing unit," and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in multiple forms, including parallel processors, serial processors, tandem processors, or cloud processing/cloud computing configurations.

The disclosure described herein relates to systems, methods, devices, and computer readable media for controlling the outputs of a plurality of light fixtures. Each light fixture includes one or more light sources (e.g., incandescent light sources, LED light sources, etc.). A system that includes the light fixtures includes one or more controllers connected to or integral with the plurality of light fixtures that is/are configured to control the outputs of the plurality of light fixtures to maintain a consistent and desired output among the plurality of light fixtures. For example, different light sources generate light in different ways, and the performance of different light sources can gradually deteriorate in different ways and at different rates over time. As an illustrative example, an LED light fixture may gradually show a reduction in brightness or a shift in color as the LEDs age, even when a consistent input control is being provided. Additionally, some LEDs can exhibit such deterioration at different rates than other LEDs (e.g., based on the wavelength of light that the LEDs produce). As a result, when attempting to generate consistent outputs among the plurality of light fixtures, these differences for each individual light fixture must be corrected in order to produce an optimal output among the light fixtures. Further, the deterioration of the outputs of the light fixtures and the need to accurately and consistently control these outputs is heightened for applications that rely upon precise applications of color theory to produce a desired lighting effect, such as theatre lighting or lighting for similar venues. In some instances, the light that is reflected off of objects or surfaces is required to match a specific desired reflection of light off of that surface (e.g., a non-white background). If the outputs of the light fixtures have deteriorated, both the deterioration of the outputs of the light fixtures and the effect those changes have on the light reflected off of a surface should be compensated to ensure a consistent and accurate reflection of light.

In some implementations, light fixtures are used in, for example, a theatre, a hall, an auditorium, a studio, or the like. As illustrated in FIG. 1, a lighting system 100 includes four light fixtures 105, 110, 115, and 120. Each of the light fixtures 105-120 is connected to a controller 125 in a wired or wireless manner for receiving control signals that control respective light outputs 130, 135, 140, and 145 of the fixtures. The system 100 also includes a sensing module 150 that is configured to be capable of sensing the light output of one or more of the light fixtures 105-120. In some implementations, the sensing module 150 senses the light output of one of the light fixtures 105-120 at a time. In other implementations, the sensing module 150 senses the light output of more than one of the light fixtures 105-120 at a time (e.g., two of the light fixtures 105-120, each of the light fixtures 105-120, etc.). The sensing module 150 is also configured to be capable of sensing the light 155 that is reflected off of a surface 160. The light fixtures 105-120, controller 125, and sensing module 150 are described in more detail below. Because the light fixtures 105-120 can include four or more light sources (e.g., seven light sources), a desired output of the light fixture can, potentially, be achieved using a variety of different combinations of lights sources having different output intensity values. These combinations of light sources are known as metamers. Metamers correspond to the same color output or color of the light fixture but vary in spectral content. The spectral content of the output of the light fixture can be important, for example, when the output of the light fixture is illuminating an object or background that is not white. In such an instance, the user may determine that the output of the light fixture should include more or less of a particular light source (i.e., a color) in order to achieve a desired reflection of light off of the object.

Figure 2:
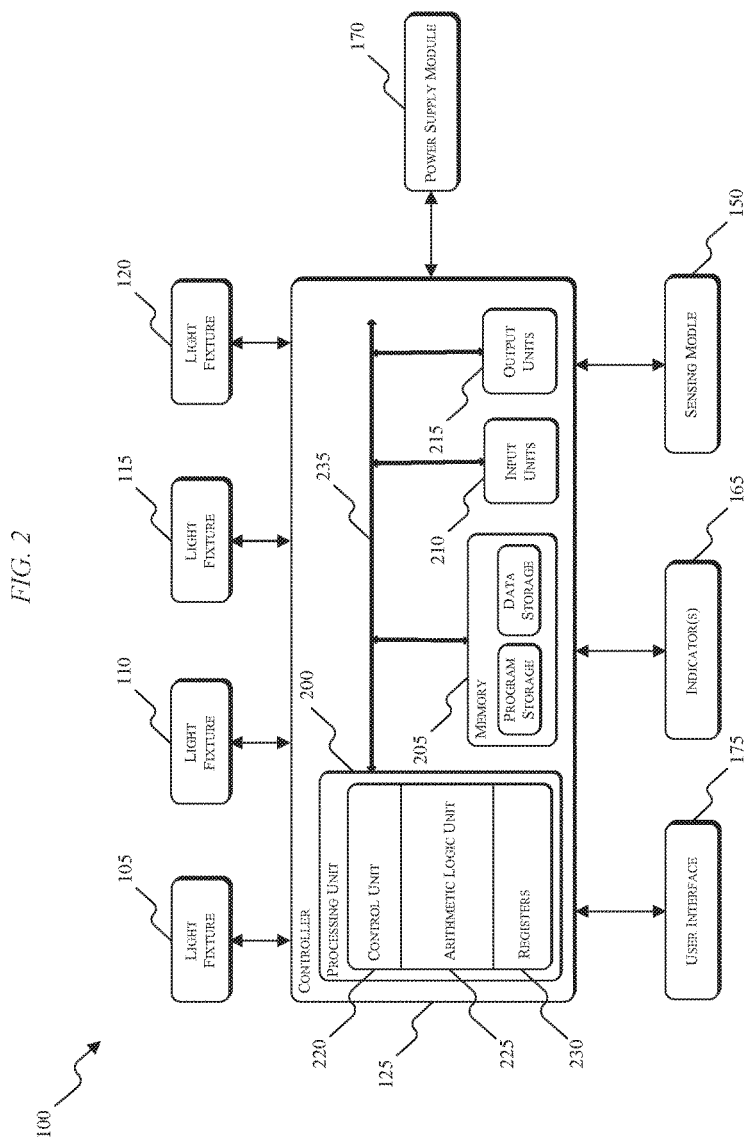
FIG. 2 illustrates a lighting system controller according to an implementation of the disclosure.

FIG. 2 illustrates the system 100 in more detail. FIG. 2 illustrates the system 100 including the controller 125 that is operable to control the plurality of light fixtures 105-120. In other implementations, each light fixture 105-120 can include its own controller. In such implementations, the controllers of the respective light fixtures are capable of communicating with one another or a central controller controls the individual light fixture controllers. For descriptive purposes, implementations of the invention described herein are described with respect to a controller 125 that is operable to control each of the light fixtures 105-120.

Specifically, the system 100 includes the controller 125, the plurality of light fixtures 105-120, the sensing module 150, one or more indicators 165, a power supply module 170, and a user interface 175. In some implementations, each light fixture 105-120 includes, for example, seven light sources (e.g., LEDs). Each light source is configured to generate light at a specific wavelength or range of wavelengths. For example, the light sources generate light corresponding to the colors red, red-orange, amber, green, cyan, blue, and indigo. In other implementations, light sources that generate different colors are used (e.g., violet, yellow, etc.). In other implementations, the light fixtures 105-120 can include incandescent light sources and a plurality of gels for creating desired color outputs. In other implementations, one or more of the light fixtures 105-120 include, for example, red, green, and blue ("RGB") light sources; red, green, blue, and amber ("RGBA") light sources; red, green, blue, and white ("RGBW") light sources; or other combinations of light sources. A seven light source implementation is primarily described herein because it is operable to reproduce substantially the entire spectrum of visible light. In other implementations, eight or more light sources are used to further enhance the light fixtures ability to reproduce visible light.

The controller 125 includes a plurality of electrical and electronic components that provide power, operational control, and protection to the components and modules within the system 100. For example, the controller 125 includes, among other things, a processing unit 200 (e.g., a microprocessor, a microcontroller, or another suitable programmable device), a memory 205, input units 210, and output units 215. The processing unit 200 includes, among other things, a control unit 220, an arithmetic logic unit ("ALU") 225, and a plurality of registers 230 (shown as a group of registers in FIG. 2), and is implemented using a known computer architecture, such as a modified Harvard architecture, a von Neumann architecture, etc. The processing unit 200, the memory 205, the input units 210, and the output units 215, as well as the various modules connected to the controller 125 are connected by one or more control and/or data buses (e.g., common bus 235). The control and/or data buses are shown generally in FIG. 2 for illustrative purposes. The use of one or more control and/or data buses for the interconnection between and communication among the various modules and components would be known to a person skilled in the art in view of the invention described herein. In some implementations, the controller 125 is implemented partially or entirely on a semiconductor (e.g., a field-programmable gate array ["FPGA"] semiconductor) chip.

The memory 205 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 200 is connected to the memory 205 and executes software instructions that are capable of being stored in a RAM of the memory 205 (e.g., during execution), a ROM of the memory 205 (e.g., on a generally permanent basis), or another non-transitory computer readable medium such as another memory or a disc. Software included in the implementation of the system 100 can be stored in the memory 205 of the controller 125. The software includes, for example, firmware, one or more applications, program data, filters, rules, one or more program modules, and other executable instructions. The controller 125 is configured to retrieve from memory and execute, among other things, instructions related to the control processes and methods described herein. For example, the controller 125 is configured to execute instructions retrieved from the memory 205 for generating necessary control signals for the light fixtures 105-120 that are required to drive the light sources of the light fixtures 105-120 to produce a desired color or consistent output. In other implementations, the controller 125 includes additional, fewer, or different components.

The sensing module 150 includes, for example, a spectroscope, spectrometer, a true color sensor, etc., for detecting and analyzing the light outputs of the light fixtures 105-120 and the light reflected off of a surface. In some implementations, the sensing module 150 is used to analyze and enable control of the spectral power distribution ("SPD") of the plurality of light fixtures to match a SPD of a reference light source. The reference light fixture can be present at a venue and be used for a continuous comparison to one of the light fixtures 105-120. Additionally or alternatively, the SPD of a desired reference light output can be stored in the memory 205 and retrieved from the memory 205 for the purpose of comparison to the detected light outputs of the light fixtures 105-120. The sensing module 150 collects electromagnetic ("EM") radiation emitted from, for example, the light fixtures 105-120 as well as a reference light fixture. The sensing module 150 includes optics integrated with a set of light sensors, a controller (or the controller 125), etc. In some implementations, the sensing module 150 enables a differential analysis of spectral features of EM radiation and analyzes spectroscopic data related to SPDs of the light fixtures 105-120 and the reference light fixture.

The user interface 175 is included to control the system 100 or the operation of an individual light fixture 105-120. The user interface 175 is operably coupled to the controller 125 to control, for example, the output of the light fixtures 105-120. The user interface 175 can include any combination of digital and analog input devices required to achieve a desired level of control for the system. For example, the user interface 175 can include a computer having a display and input devices, a touch-screen display, a plurality of knobs, dials, switches, buttons, faders, or the like. In some implementations, the user interface 175 is separated from the system 100 and light fixtures 105-120. The invention can also be implemented using a variety of color control methodologies, such as HSI, RGB, CYM, YIQ, YUV, HSV, HLS, XYS, etc. The input control techniques described herein are exemplary, and other input control techniques are within the spirit and scope of the invention. Additionally, the invention is capable of being implemented internal to or external from each of the light fixtures 105-120. For example, the controller 125 includes sufficient memory and processing power to execute one or more programs associated with the inventive methods. Additionally or alternatively, each of the light fixtures 105-120 can include sufficient memory and processing power to execute one or more programs associated with the inventive methods.

The power supply module 170 supplies a nominal AC or DC voltage to the system 100 and/or light fixtures 105-120. The power supply module 170 is powered by mains power having nominal line voltages between, for example, 100V and 240V AC and frequencies of approximately 50-60 Hz. The power supply module 170 is also configured to supply lower voltages to operate circuits and components within the system 100. Additionally or alternatively, the system 100 can receive power from one or more batteries or battery packs.

Figure 3:
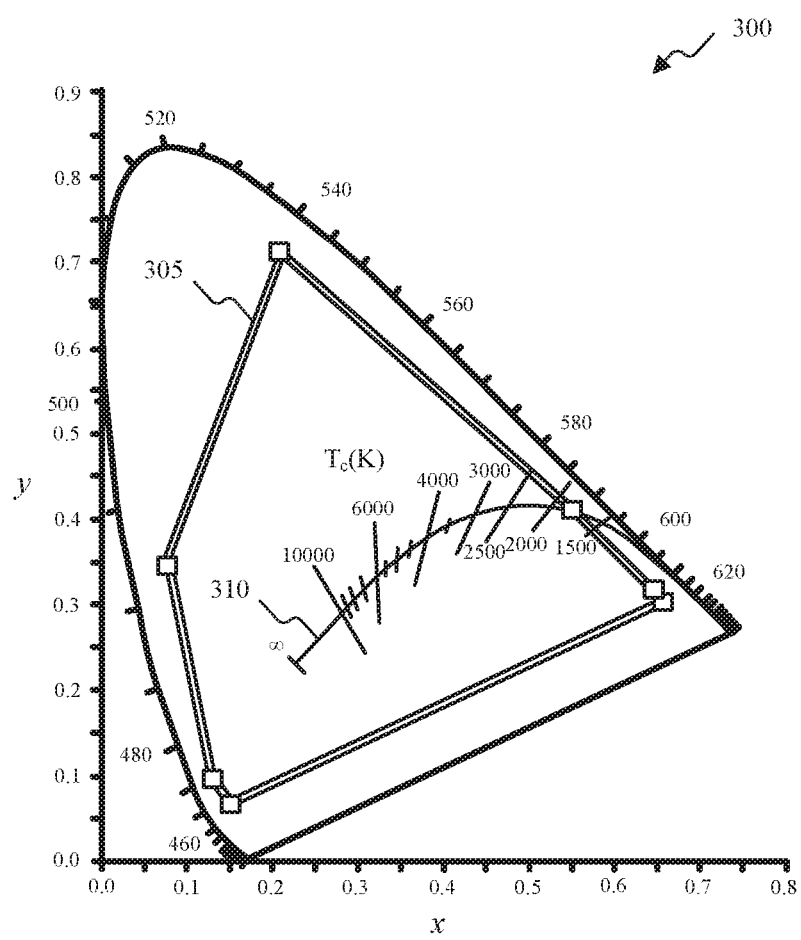
FIG. 3 is the International Commission on Illumination ("CIE") 1931 color space chromaticity diagram and illustrates a gamut of a light fixture.
Figure 4:
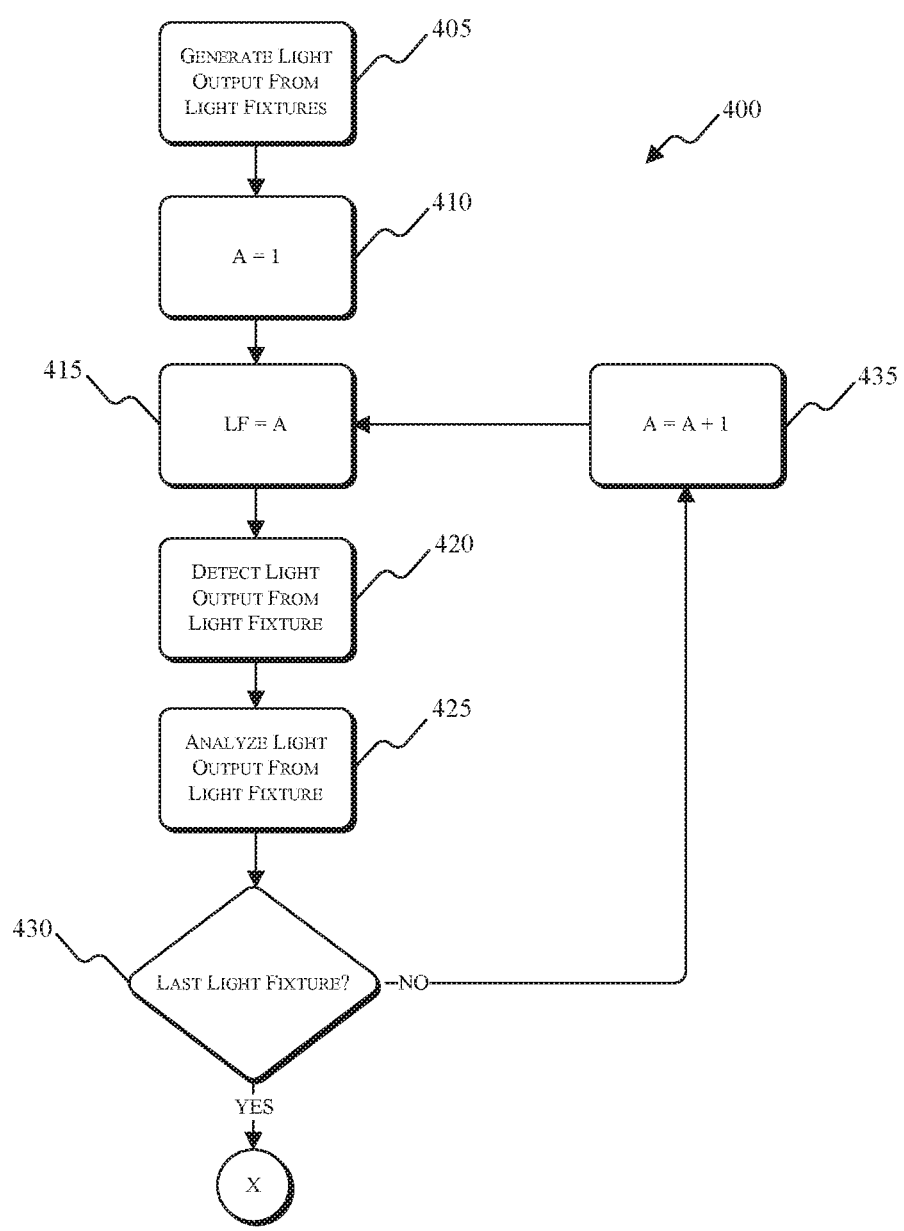
FIGS. 4-7 are a process for controlling the output of a plurality of lighting fixtures according to one implementation of the disclosure.

FIG. 3 illustrates the CIE xyY color space 300 and the available color gamut 305 for a light fixture. As such, only colors that fall within or on the illustrated color gamut 305 are reproducible by the light fixture. Also illustrated is the Planckian locus 310, which illustrates the various color temperatures for an idea black-body radiator. The CIE xyY color space 300 represents x-coordinates with values between 0.0 and 0.8, and y-coordinates with values between 0.0 and 0.9. To avoid floating point calculations, 16-bit integers are used in some implementations to represent both the x-coordinate and the y-coordinate. An integer value of zero corresponds to a coordinate of 0.0, and an integer value of 32,767 corresponds to a coordinate of 1.0. Therefore, some implementations of the invention achieve a resolution of 1/32,767 or approximately 0.00003.

FIGS. 4-7 illustrate a process 400 for controlling the output of a plurality of light fixtures. Specifically, the process 400 is implemented to control the output of a plurality of light fixtures based on potential differences among the light fixtures, as well as based on the characteristics of the light that is reflected off one or more surfaces. The process 400 is used to provide a consistent light output (among the light fixtures) and an accurate reflection of light off of the one or more surfaces (with respect to a desired lighting effect). As such, the process 400 can be used to analyze and make consistent the light outputs of a plurality of light fixtures (e.g., LED light fixtures, incandescent light fixtures, etc.) and select a proper metamer to produce the desired lighting effect (e.g., reflection of light) for a given venue. The process 400 is shown as being executed by the controller 125 and performed in an iterative and serial manner. In some instances, the order in which steps are performed is provided for illustrative purposes and those steps may be executed in an order other than that provided in FIGS. 4-7 without affecting the results of the process 400. For example, the step including the detection of the reflection of light off of a surface may be performed earlier in the process 400 than illustrated. Additionally, in some implementations, one or more of the illustrated steps may be combined or removed based on the particular application and needs for the process 400. For example, in some implementations, new or updated values for output color, output brightness, and spectrum are determined at the same time, rather than individually and separately. Such an implementation may improve response times of the system 100 and reduce processing requirements when implementing the process 400. For illustrative purposes, however, the steps of the process 400 are set forth in a more explicit and discrete manner.

The process 400 begins with light outputs from a plurality of light fixtures being generated (step 405). At step 410, a variable, A, is initialized to a value of 1 and a light fixture parameter, LF, is set equal to the variable, A, (step 415). At step 420, the light output from the light fixture, LF, is detected and then analyzed (step 425). The light is analyzed to determine a variety of characteristics of the light. For example, the output of the light fixture can be analyzed to determine the color of the output of the light fixture, the brightness of the output of the light fixture, the spectrum of the output of the light fixture, etc. The results of this analysis can, for example, be stored in the memory 205 of the controller 125 for later use and/or comparison. If the light fixture, LF, is the last light fixture at step 430, the process 400 proceeds to control section X shown in and described with respect to FIG. 5. If, at step 430, the light fixture, LF, is not the last light fixture, the variable, A, is incremented (step 435) and the light fixture parameter, LF, is set equal to the incremented value of the variable, A, (step 415). Steps 415-435 are performed until the light output of the last light fixture has been detected and analyzed. In some implementations, the system includes two or more light fixtures. Additionally, although the process 400 is illustrated in a variety of instances with respect to incrementing a variable and executing specific steps for each iteration, such an iterative technique is provided for illustrative purposes. The invention is also capable of being implemented in such a way that incrementing a variable is not strictly required.

Figure 5:
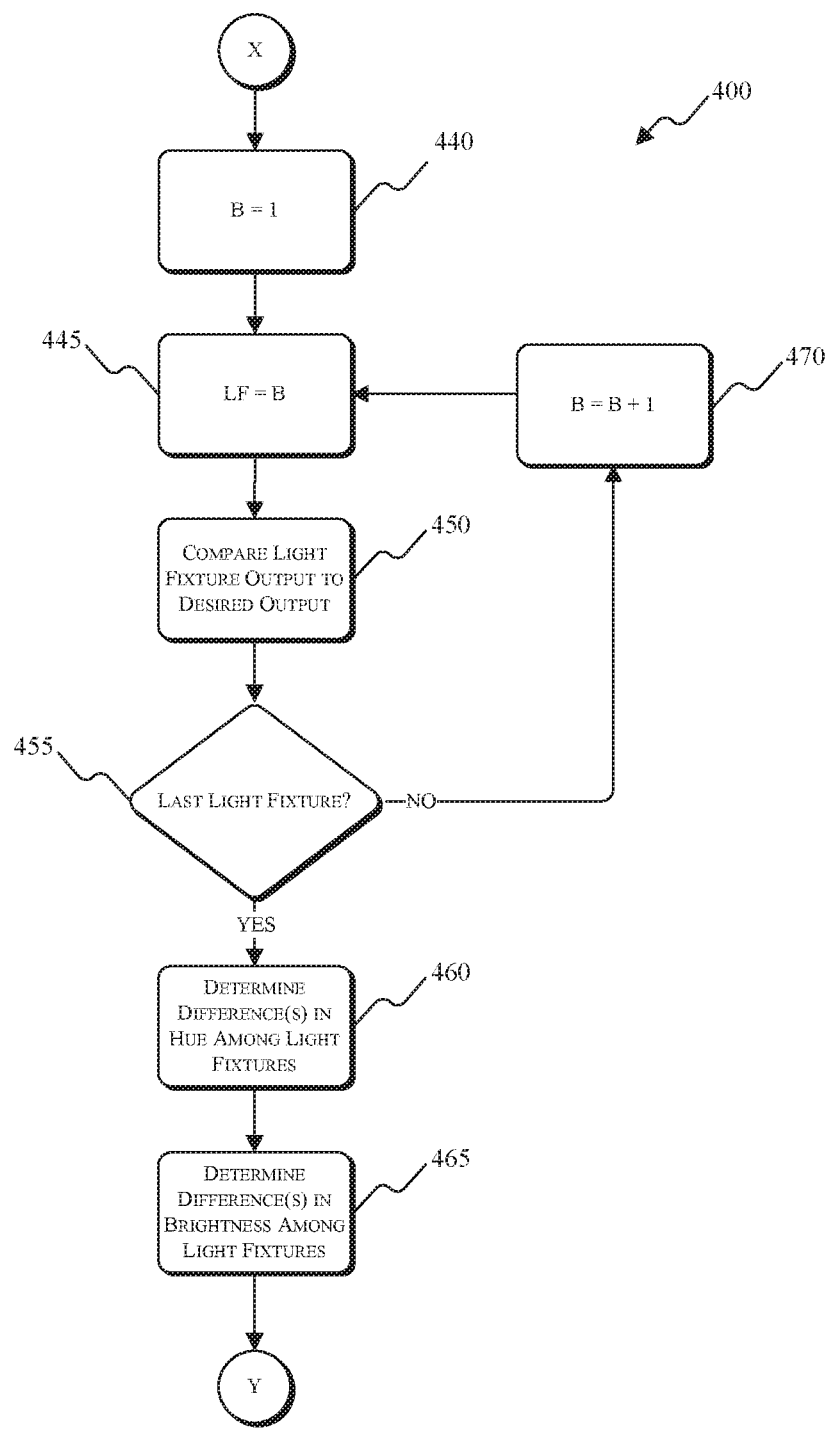

After the light output of the last light fixture has been detected and analyzed, the process 400 proceeds to step 440 in FIG. 5. At step 440, a variable, B, is initialized to a value of 1 and a light fixture parameter, LF, is then set equal to the variable, B, (step 445). At step 450, the light output of the light fixture, LF, is compared to a desired light output. The desired light output is associated with, for example, a control input from a user interface related to a desired color output (e.g., a CIE color space point, etc.) and a desired brightness output (e.g. a brightness percent, lumens, etc.) for the light fixture. Additionally or alternatively, the desired color output and the desired brightness output can be calculated or retrieved from a memory. The output color can then be compared to the desired color by directly comparing a determined CIE color point for the light output to a CIE color point for the desired color output. The output brightness can be compared to the desired brightness by comparing a desired lumen output with a determined lumen output for the light fixture. The comparisons may result in relative or absolute differences between the desired color or brightness and outputs of the light fixture that can be compensated as necessary to bring them into correspondence with one another, as described below.

If the light fixture, LF, is the last light fixture at step 455, the controller 125 determines differences in color among the light outputs of the light fixtures (step 460). It is possible that each of the light fixtures, LF, has a color that fails to correspond to the color of the desired light output. Alternatively, at least one of the light sources may have an output color that corresponds to the desired color. As a result, the number of light fixtures that may require compensation to correctly correspond to the desired color output may be all of the light fixtures or a subset of the light fixtures.

The differences in color (or brightness) among the light fixtures can be determined in a variety of ways. For example, determining differences among the light outputs of the light fixtures may include comparing each light output of each light fixture to every other light output of every other light fixture. Such a technique provides direct comparisons among the light outputs of the light fixtures. Additionally or alternatively, the light output of each light fixture can be compared to the desired light output for each light fixture. In such implementations, the relative differences among the light outputs of the light fixtures are determined with respect to the same reference value (i.e., the desired output). In implementations where both direct and relative differences among the light outputs of the light fixture are determined, the controller 125 can, for example, use the direct differences among the light outputs of the light fixtures to make all of the light outputs of the light fixtures consistent with the light output that was closest to the desired light output. The relative differences between that light output and the desired output can then be used to bring all of the light outputs of the light fixtures into correspondence with the desired light output.

The controller then determines differences in brightness among the light outputs of the light fixtures (step 465). For example, it is possible that each of the light fixtures, LF, has a brightness that fails to correspond to the brightness of the desired light output. Alternatively, at least one of the light sources may have an output brightness that corresponds to the desired brightness. As a result, the number of light fixtures that may require compensation to correctly correspond to the desired brightness output may be all of the light fixtures or a subset of the light fixtures. The controller 125 uses the comparisons of the output brightnesses of the light fixtures to the desired output brightnesses to determine differences among the individual light fixtures as previously described.

If, at step 455, the light fixture, LF, is not the last light fixture, the variable, B, is incremented (step 470) and the light fixture parameter, LF, is set equal to the incremented value of the variable, B, (step 445). Steps 445-455 are performed until the light output of the last light fixture has been compared to a desired light output.

Figure 6:
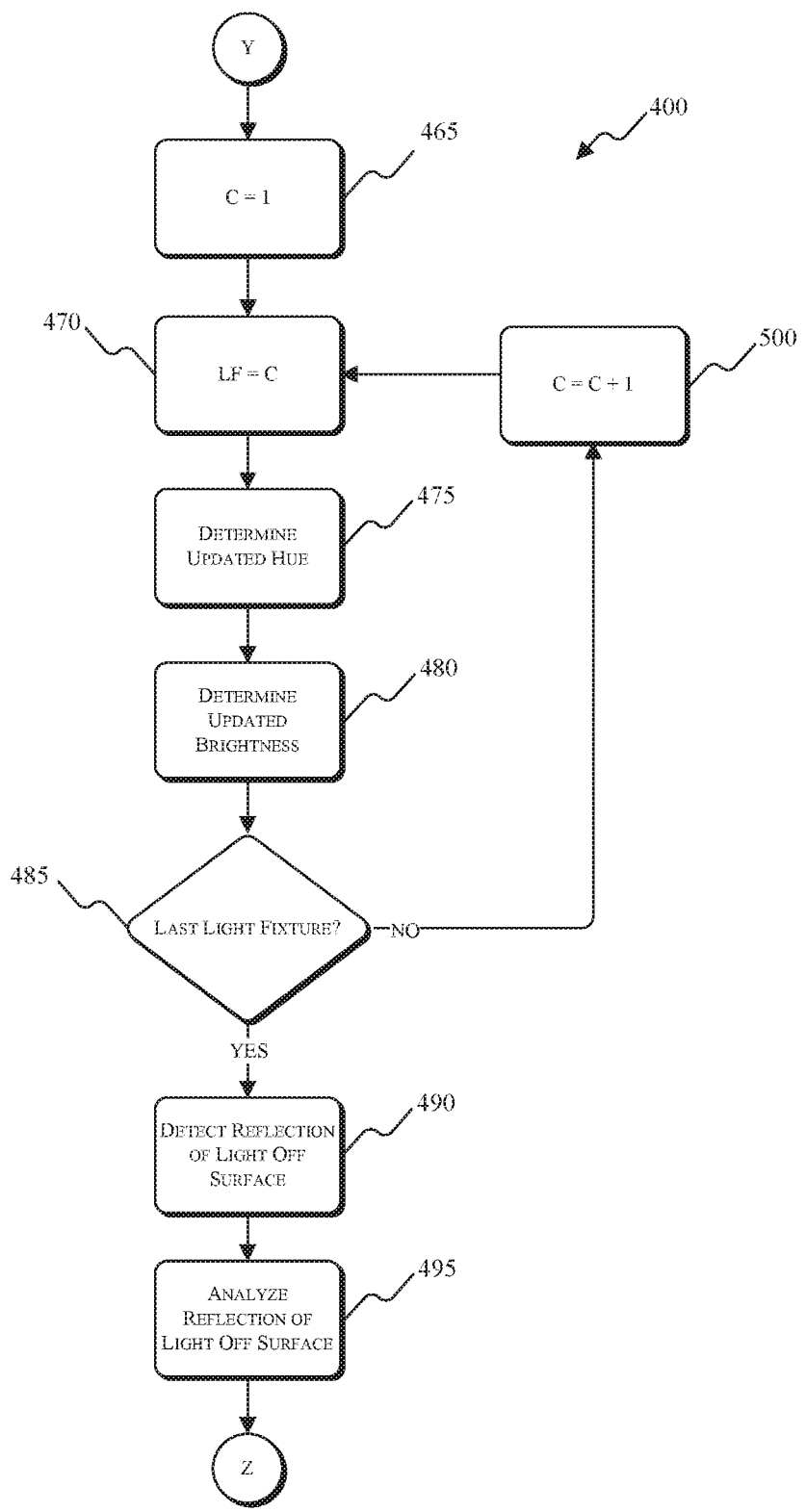

Following step 465, the process 400 proceeds to control section Y shown in and described with respect to FIG. 6. At step 465, a variable, C, is initialized to a value of 1 and a light fixture parameter, LF, is set equal to the variable, C, (step 470). At step 475, a new or updated value for the output color of the light fixture, LF, is determined. The updated value for the color is determined based on the comparison of the desired color output and the actual color output of the light fixture in step 450 and/or the determination of the differences among the light fixture color outputs at step 460. In order to determine the new or updated color for the light fixture, a process similar to that disclosed in U.S. Pat. No. 8,384,294, entitled "SYSTEM AND METHOD FOR COLOR CREATION AND MATCHING", the entire content of which is hereby incorporated by reference, can be used. In some implementations, a simplex algorithm is used to find a best spectral and brightness match for a respective fixture. As a result, any difference between the actual output color and the desired output color that was determined to be present can be accurately compensated such that the light fixture, LF, produces the desired output color.

The controller then determines a new or updated value for the output brightness of the light fixture, LF, (step 480). A similar procedure to that described above with respect to determining a new value for color can be used to determine a new value for brightness. In some implementations, given a difference between the actual brightness output and the desired brightness output for the light fixture, the output of the light fixture can be normalized such that it produces the desired brightness. For example, if the brightness of the light fixture was supposed to have a value of 100% of full brightness, but instead had a value corresponding to 80% of full brightness, the brightness or output drive value settings for each light source in the light fixture could be increased by 20%. Such a modification substantially corrects the difference in brightness between the actual brightness output and the desired brightness output. If a desired brightness for the light fixture is not obtainable (e.g., the deterioration in brightness due to age cannot be overcome), the controller 125 can select a maximum possible percentage increase for all of the light sources in the light fixture and increase the brightness of each light source by that value to achieve the closest possible match to the desired brightness.

If the light fixture, LF, is the last light fixture at step 485, the controller 125 detects the reflection of light off of one or more surfaces (step 490), and analyzes the reflection of light off of the one or more surfaces (step 495). The reflected light that is detected can be detected using the sensing module 150 described above such that the SPD of the reflected light can be analyzed. The reflected light that is detected can be analyzed, for example, by determining the constituent wavelengths of light that make up the reflected light and their respective spectral powers. The color of the surface for which light is reflecting off corresponds to the colors of light being produced by the light fixture that are not being absorbed by the surface. The results of this analysis can, for example, be stored in a memory of the controller 125 for later use and/or comparison. If, at step 485, the light fixture, LF, is not the last light fixture, the variable, C, is incremented (step 500) and the light fixture parameter, LF, is set equal to the incremented value of the variable, C, (step 470). Steps 470-500 are performed until the light output of the last light fixture has been compared to a desired light output.

Figure 7:
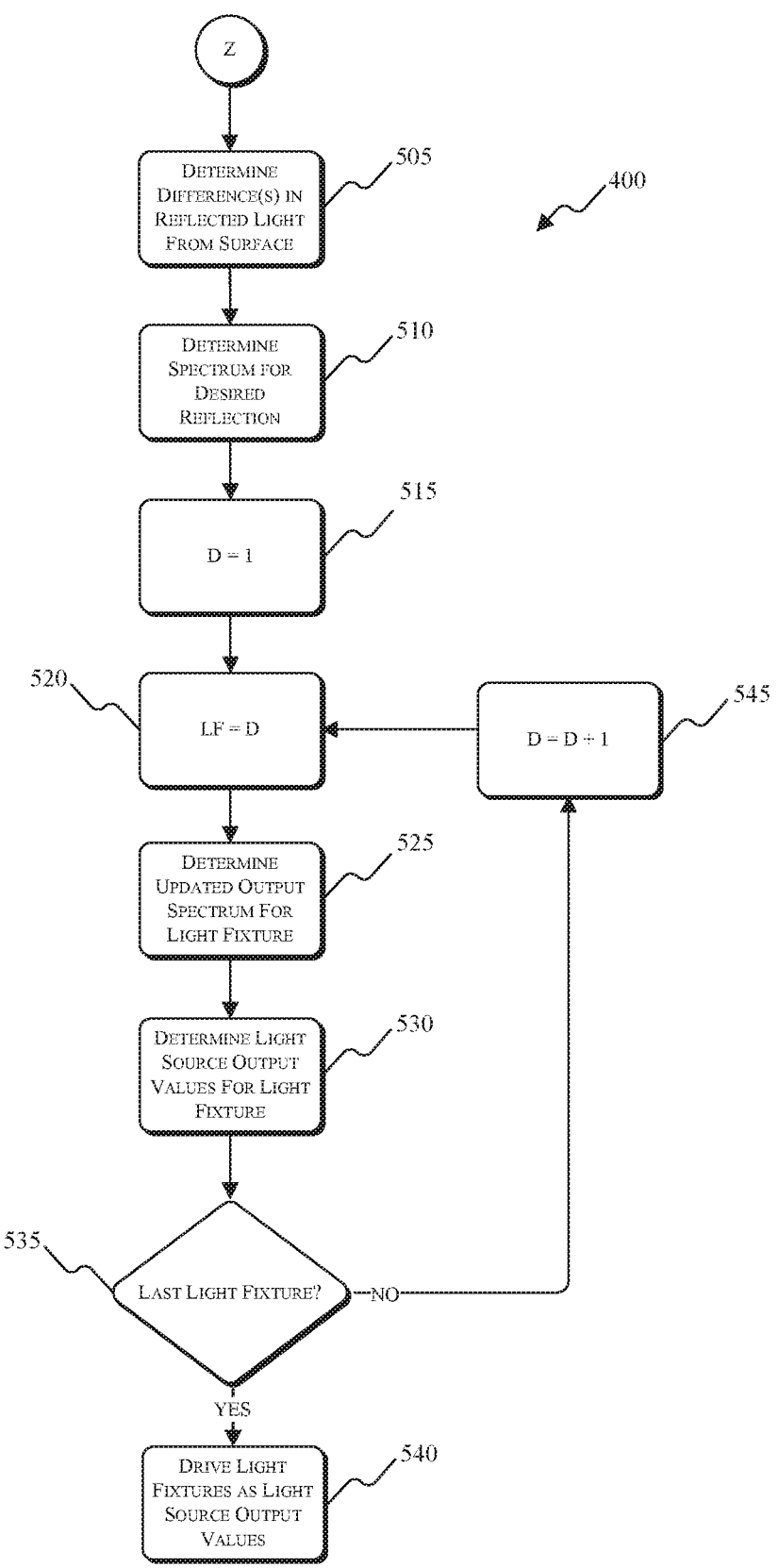

After the reflection of light off of the one or more surfaces has been analyzed, the process 400 proceeds to step 505 in FIG. 7 where the controller 125 determines differences (if any) between the reflected light off of the one or more surfaces and an input or setting for the expected or desired reflection of light off of the one or more surfaces. As described above, when a plurality of light sources are present that produce substantially discrete wavelengths of light (e.g., four or more LEDs), it is possible to produce the same color output or color using a variety of different combinations of drive values for the light sources. Each of the different possible combinations of drive values for the light sources that produce the same color is known to those in the art as a metamer. Although the light output by the light fixture is independent of the metamer that is selected, the reflection of that light off of a surface that absorbs specific wavelength of light can vary significantly depending upon the selected metamer. As such, given the properties or characteristics of the surface (or object including the surface) for which light is being reflected, some light source colors that are used to generate the desired color may be emphasized more than others. The properties or characteristics of the surface can be entered by a user or retrieved from a memory. Similarly, a desired reflection of light off of the surface can be entered by a user or retrieved from a memory.

Based on the determination of any differences between the light reflected off of the one or more surfaces in step 505 and the expected or desired reflection of light, the controller 125 determines a new or updated spectrum of light (e.g., a metamer) that will more accurately and closely produce the desired reflection of light off of the one or more surfaces (step 510). For example, using the properties or characteristics of the surface and a desired reflection of light off of the surface, the controller 125 can calculate or determine an approximate spectrum of light that properly emphasizes the wavelengths of light that are both reflected from and absorbed by the surface. In some implementations, the spectrum can be retrieved from a memory (e.g., memory 205). A process similar to that disclosed in U.S. Pat. No.

8,723,450, entitled "SYSTEM AND METHOD FOR CONTROLLING THE SPECTRAL CONTENT OF AN OUTPUT OF A LIGHT FIXTURE", the entire content of which is hereby incorporated by reference, can be used to select or control output spectrum. The new or updated spectrum of light for the light fixture is determined without further changing the output color or the output brightness of the light fixture.

At step 515, a variable, D, is initialized to a value of 1 and a light fixture parameter, LF, is set equal to the variable, D, (step 520). At step 525, a new or updated target output spectrum for the light fixture, LF, is set or determined. The new or updated target output spectrum will correspond or substantially correspond to the spectrum determined at step 510. In some implementations, a light fixture may not be able to produce the desired spectrum determined at step 510. For example, a seven color LED light fixture can produce more possible output colors and spectrums than a three or four color LED light fixture. As a result, when switching from venue to venue (each of which may include different types of light fixtures), the capabilities of the individual light fixtures may be limited. In the event that a light fixture is incapable of producing the desired output spectrum, the closest possible output spectrum that the light fixture can produce to the desired output spectrum will be set.

After the new or updated output spectrum for the fixture has been set for each light fixture, the controller 125 determines the light source drive values required to generate the new or updated output spectrum (step 530). As described above, the updated color for each of the light fixtures was previously determined. However, given the aging of the light sources, and the manner in which aging affects different colors of light sources, any drive values that are ultimately required to produce a desired color, a desired brightness, and a desired spectrum of light may vary for each individual light fixture. As such, the light source drive values for each light fixture are calculated dependent in part upon the previously identified differences between the desired color output and the actual color output, the desired brightness and the actual brightness, and the desired spectrum.

If the light fixture, LF, is the last light fixture at step 535, the controller 125 drives the light fixtures at the determined light source output values (step 540). If, at step 535, the light fixture, LF, is not the last light fixture, the variable, D, is incremented (step 545) and the light fixture parameter, LF, is set equal to the incremented value of the variable, D, (step 520). Steps 520-545 are performed until the light source output values for each light fixture have been determined.

The appearance of light can be measured and described as a light spectrum. In some implementations, as described herein, the controller 125 uses spectrum data to produce a desired light output. In some implementations, desired spectrums are determined based on known spectrum data, often in the form of a pre-existing "library" of spectrum data. For example, the spectrum of a known luminaire and lamp, or the spectrum of a known lamp with a filter, commonly referred to as a gel. In some instances, however, ad hoc spectrum data (e.g., custom spectrum data) is needed to produce a desired light output. For example, a lighting system used in a theatre may require ad hoc spectrum data for a plurality of predefined "looks" to produce light outputs necessary for a specific performance.

Figure 8:
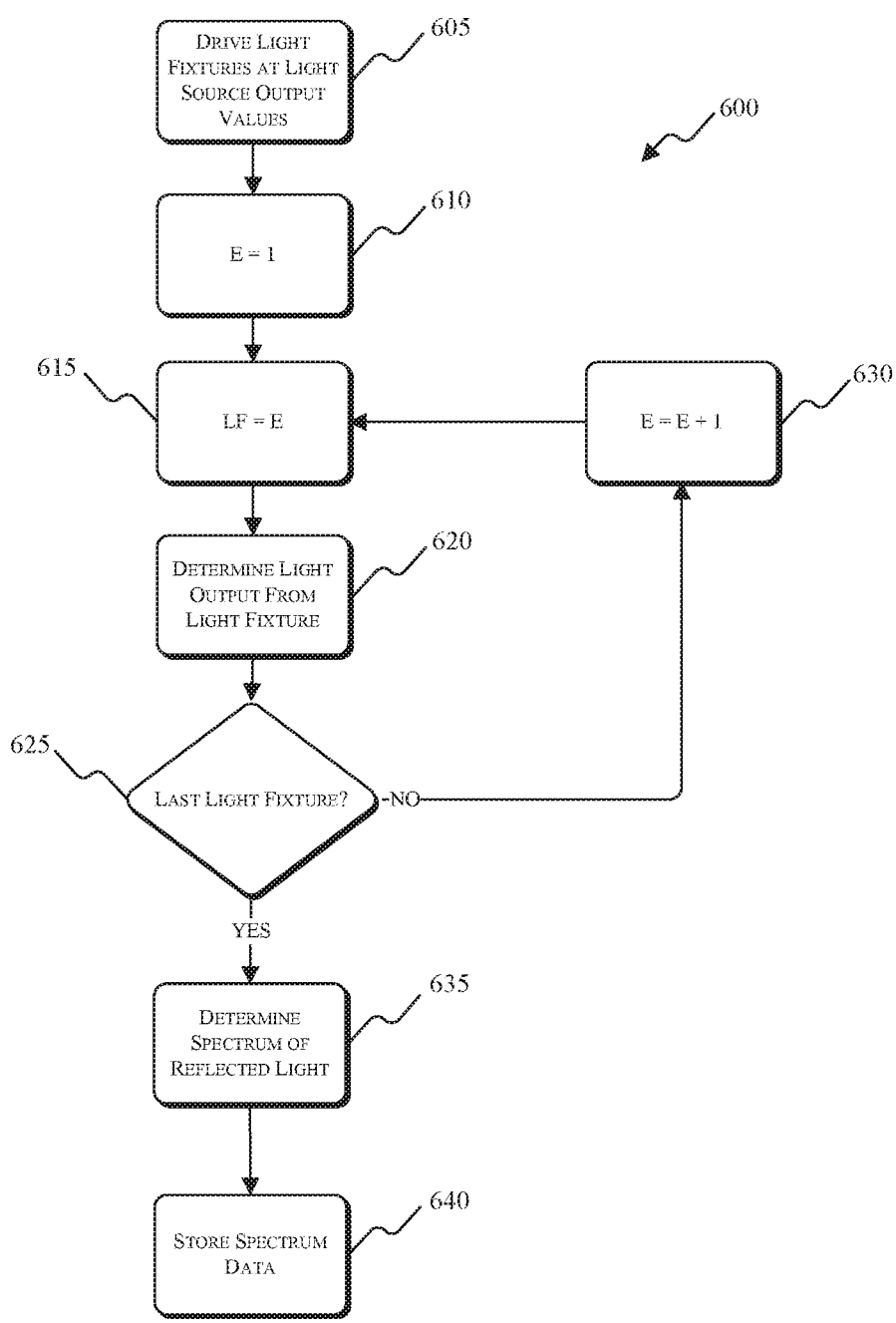
FIG. 8 is a process for capturing ad hoc spectrum data in a lighting system according to an implementation of the disclosure.

FIG. 8 illustrates a process 600 for generating ad hoc spectrum data for a predefined "look." The process 600 can be used to archive existing art for the purpose of reproducing it accurately in the future. The process 600 begins with the light fixtures being driven at a set of light source output values (step 605). At step 610, a variable, E, is initialized to a value of 1 and a light fixture parameter, LF, is set equal to the variable, E, (step 615). At step 620, the light output from the light fixture, LF, is determined. In some implementations, the sensing module 150 (e.g., a spectrometer) detects the light output from the light fixture, LF, and transmits corresponding spectrum data to the controller 125. In some implementations, the sensing module 150 detects the light output in response to receiving a command from the controller 125. If the light fixture, LF, is not the last light fixture at step 625, the variable, E, is incremented (step 630) and the light fixture parameter, LF, is set equal to the incremented value of the variable, E, (step 615). Alternatively, if the light fixture, LF, is the last light fixture at step 625, a spectrum of the light reflected off of the surface 160 is determined (step 635). The light reflected off of the surface 160 corresponds to light from the plurality of light fixtures that is reflected off of the surface 160. In some implementations, the sensing module 150 detects the light reflected off of the surface 160 and transmits corresponding spectrum data to the controller 125. In some implementations, the sensing module 150 detects the light reflected off of the surface 160 in response to receiving a command from the controller 125. At step 640, the collected spectrum data is stored for potential future use. For example, the spectrum data can be stored in a memory or database and later accessed to reproduce the same light output.

Figure 9:
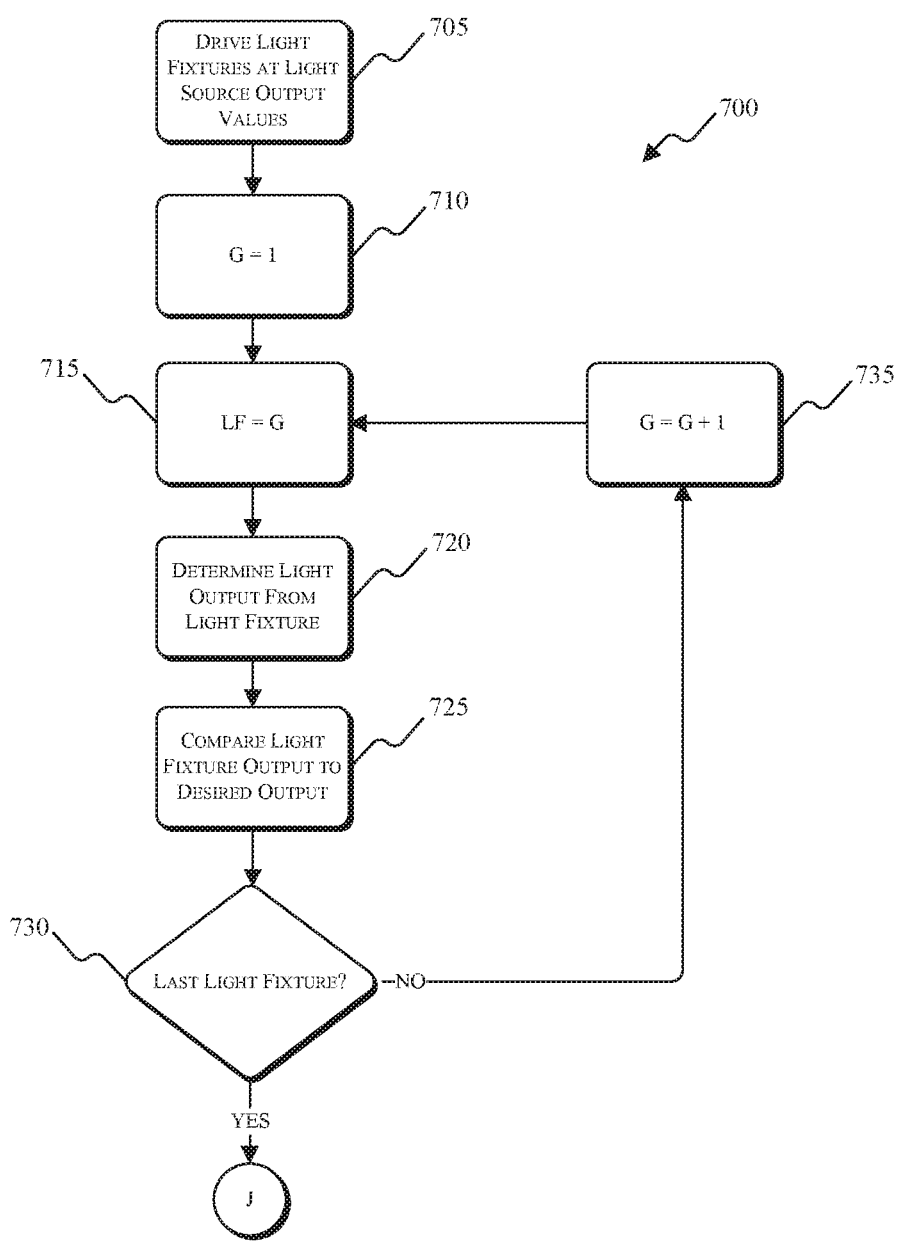
FIGS. 9 and 10 are a process for controlling the output of a plurality of lighting fixtures according to one implementation of the disclosure.
Figure 10:
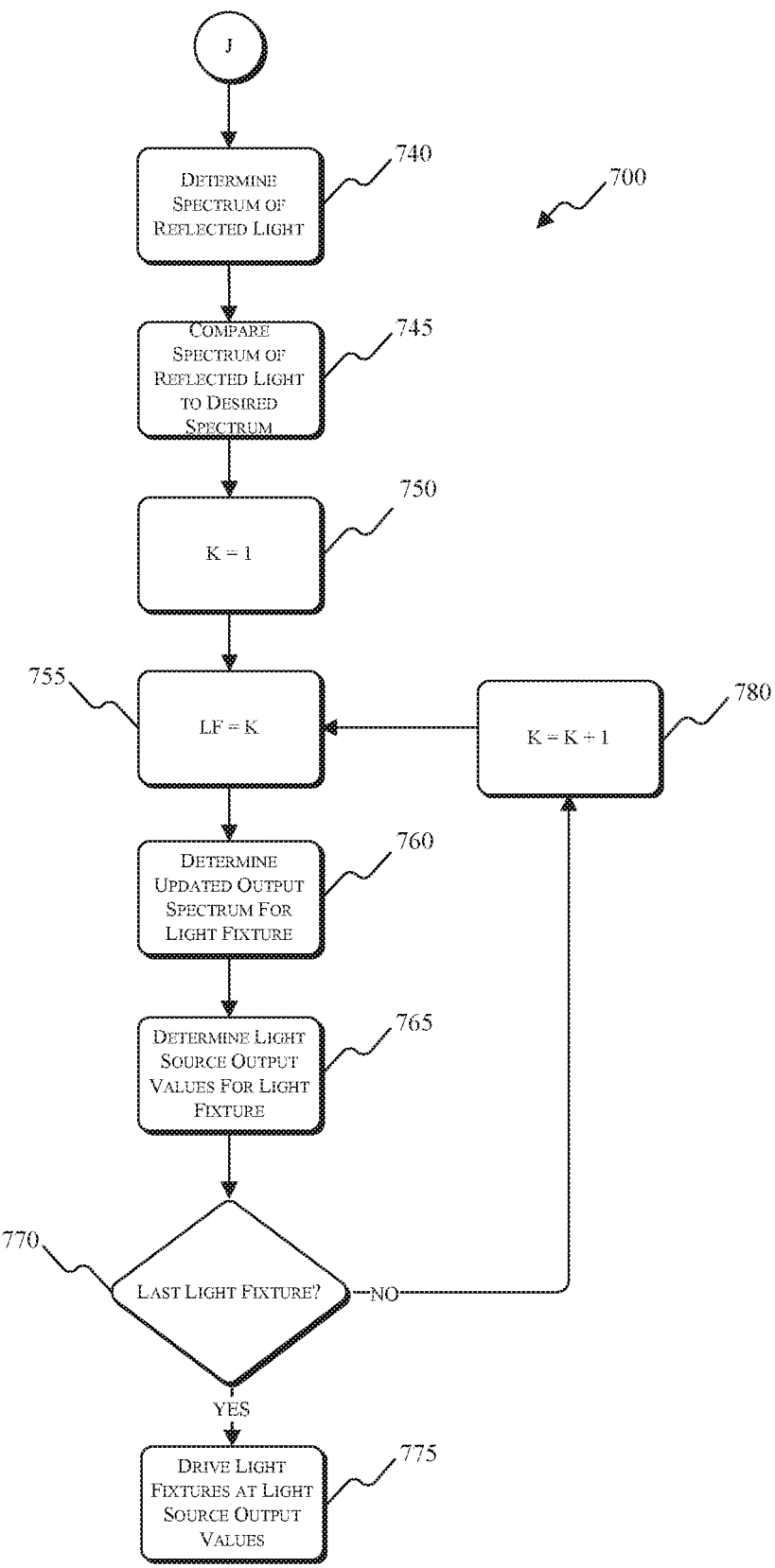

FIGS. 9 and 10 illustrate a process 700 for controlling a plurality of light fixtures according to some implementations. Specifically, the process 700 is implemented to control the output of a plurality of light fixtures based on spectrum data input from a plurality of sources, such as, a spectrometer, a database or library, user entered, a light fixture, another lighting system, or any combination thereof.

The process 700 begins with the light sources in the plurality of light fixtures being driven at a set of light source output values (step 705). In some implementations, the controller 125 determines the set of light source output values based at least in part on spectrum data input. For example, the controller 125 can receive spectrum data input and determine the light source output values for each light fixture in order for the light fixtures to produce physical light output that substantially matches the input. In some implementations, the controller 125 receives the spectrum data input from the sensing module 150, the user interface 175, a light fixture, or any combination thereof. In some implementations, the controller 125 receives (or retrieves) the spectrum data input from an electronic database (or library). In some implementations, the spectrum data input is transmitted to and from the controller 125 via a network (such as TCP/IP and UDP), a file, explicit user entry, graphical user entry, DMX, RDM, USB, serial, Bluetooth®, Wi-Fi, ZigBee®, or any combination thereof.

Returning to FIG. 8, at step 710, a variable, G, is initialized to a value of 1 and a light fixture parameter, LF, is set equal to the variable, G, (step 715). At step 720, the light output from the light fixture, LF, is determined. For example, the sensing module 150 can detect the light output from the light fixture, LF, and transmit corresponding spectrum data to the controller 125. At step 725, the light output from the light fixture, LF, is compared to a desired output light output to determine a difference. For example, the spectrum data from the sensing module 150 is compared to a desired output spectrum for the light fixture, LF, to determine a difference. If the light fixture, LF, is the last light fixture at step 730, the process 700 proceeds to control section J shown in and described with respect to FIG. 10. If, at step 730, the light fixture, LF, is not the last light fixture, the variable, G, is incremented (step 735) and the light fixture parameter, LF, is set equal to the incremented value of the variable, G, (step 715). Steps 715-735 are performed until the light output of the last light fixture has been determined and analyzed.

After the light output of the last light fixture has been determined and analyzed, the process 700 proceeds to step 740 in FIG. 10. At step 740, a spectrum of light reflected off of the surface 160 is determined. For example, the sensing module 150 can detect light reflected off of the surface 160 caused by the light output of the light fixtures and transmit corresponding spectrum data to the controller 125. At step 745, the controller 125 determines differences (if any) between the spectrum of light reflected off of the surface 160 and a desired reflection of the light reflected off of the surface 160.

At step 750, a variable, K, is initialized to a value of 1 and a light fixture parameter, LF, is set equal to the variable, K, (step 755). At step 760, a new or updated target output spectrum for the light fixture, LF, is set or determined. In some implementations, the new or updated target output spectrum is determined based at least in part on the previously identified differences between the determined light fixture output and the desired light fixture output. Alternatively or in addition, the new or updated target output spectrum is determined based at least in part on the previously identified differences between the determine spectrum of light reflected off of the surface 160 and the desired spectrum of light reflected off of the surface 160. After the new or updated output spectrum for the light fixture, LF, has been set, the controller 125 determines new or updated light source output values required to generate the new or updated output spectrum (step 765). If the light fixture, LF, is the last light fixture at step 770, the controller 125 drives the light fixtures at the new or updated light source output values (step 775). If, at step 770, the light fixture, LF, is not the last light fixture, the variable, K, is incremented (step 780) and the light fixture parameter, LF, is set equal to the incremented value of the variable, K, (step 755). Steps 755-770 are performed until the light source output values for each light fixture have been determined.

In some implementations, the controller 125 determines the accuracy of the lighting system 100 based on the difference between previously-determined spectrum data (e.g., previously-stored spectrum data) and real-time spectrum data. For example, the controller 125 can determine a reproduction accuracy value of the lighting system 100 based at least on part on the differences between the determined light fixture output and the desired light fixture output, the differences between the determined spectrum of light reflected off of the surface 160 and the desired spectrum of light reflected off of the surface 160, or a combination of both.

Thus, the disclosure provides, among other things, systems, methods, devices, and computer readable media for controlling the light output of a plurality of light fixtures in order to produce consistent and accurate light outputs among the light fixtures and a desired reflection of light off of one or more surfaces. Various features and advantages of the disclosure are set forth in the following claims.

What is claimed is:

1. A method of controlling a plurality of light fixtures, the method comprising:
    driving light sources in each of the plurality of light fixtures at a first set of light source output values;
    determining first light outputs for each of the plurality of light fixtures, each of the first light outputs having a first output spectrum;
    determining a first spectrum of light reflected off of a surface, the light reflected off of the surface corresponding to light from the plurality of light fixtures;
    determining a first difference between the first light outputs and desired light outputs for each of the plurality of light fixtures;
    determining a second difference between the first spectrum of light reflected off of the surface and a desired spectrum of light reflected off of the surface;
    calculating an updated output spectrum for the plurality of light fixtures based at least in part on the first difference and the second difference;
    determining a second set of light source output values based at least in part on the updated output spectrum; and
    driving the light sources in each of the plurality of light fixtures at the second set of light source output values.

2. The method of claim 1, wherein determining the first light outputs for each of the plurality of light fixtures includes detecting the first light outputs for each of the plurality of light fixtures using a spectrometer, and wherein determining the first spectrum of light reflected off of the surface includes detecting the first spectrum of light reflected off of the surface using the spectrometer.

3. The method of claim 1, further comprising
    prior to driving the light sources in each of the plurality of light fixtures at the first set of light source output values,
    receiving spectrum data input; and
    determining the first set of light source output values based at least in part on the spectrum data input.

4. The method of claim 3, wherein receiving the spectrum data input includes receiving the spectrum data input from at least one source selected from a group consisting of a spectrometer, a user interface, and a light fixture.

5. The method of claim 1, further comprising
    prior to driving the light sources in each of the plurality of light fixtures at the first set of light source output values,
    driving the light sources in each of the plurality of light fixtures at a third set of light source output values;
    determining second light outputs for each of the plurality of light fixtures, each of the second light outputs having a second output spectrum;
    determining a second spectrum of light reflected off of the surface;
    determining the desired light outputs for each of the plurality of light fixtures based at least in part on the second light outputs;
    determining the desired spectrum of light reflected off of the surface based at least in part on the second spectrum of light reflected off of the surface; and
    determining the first set of light source output values based at least in part on the desired light outputs for each of the plurality of light fixtures and the desired spectrum of light reflected off of the surface.

6. The method of claim 5, wherein determining the second light outputs for each of the plurality of light fixtures includes detecting the second light outputs for each of the plurality of light fixtures using a spectrometer, and
    wherein determining the second spectrum of light reflected off of the surface includes detecting the second spectrum of light reflected off of the surface using the spectrometer.

7. The method of claim 1, further comprising
determining a reproduction accuracy value for the plurality of light fixtures based at least in part on the first difference and the second difference.

8. A lighting system comprising:
a plurality of light fixtures, each of the plurality of light fixtures including a plurality of light sources; and
a controller configured to
drive the plurality of light sources in each of the plurality of light fixtures at a first set of light source output values,
determine first light outputs for each of the plurality of light fixtures, each of the first light outputs having a first output spectrum,
determine a first spectrum of light reflected off of a surface, the light reflected off of the surface corresponding to light from the plurality of light fixtures,
determine a first difference between the first light outputs and desired light outputs for each of the plurality of light fixtures,
determine a second difference between the first spectrum of light reflected off of the surface and a desired spectrum of light reflected off of the surface,
calculate an updated output spectrum for the plurality of light fixtures based at least in part on the first difference and the second difference,
determine a second set of light source output values based at least in part on the updated output spectrum, and
drive the plurality of light sources in each of the plurality of light fixtures at the second set of light source output values.

9. The lighting system of claim 8, further comprising
a spectrometer configured to
detect the first light outputs for each of the plurality of light fixtures,
detect the first spectrum of light reflected off of the surface, and
transmit the first light outputs for each of the plurality of light fixtures and the first spectrum of light reflected off of the surface to the controller.

10. The lighting system of claim 8, wherein the controller is further configured to
receive spectrum data input, and
determine the first set of light source output values based at least in part on the spectrum data input.

11. The lighting system of claim 10, wherein the controller receives the spectrum data input from at least one source selected from a group consisting of a spectrometer, a user interface, and a light fixture.

12. The lighting system of claim 8, wherein, prior to driving the plurality of light sources in each of the plurality of light fixtures at the first set of light source output values, the controller is configured to
drive the plurality of light sources in each of the plurality of light fixtures at a third set of light source output values,
determine second light outputs for each of the plurality of light fixtures, each of the second light outputs having a second output spectrum,
determine a second spectrum of light reflected off of the surface,
determine the desired light outputs for each of the plurality of light fixtures based at least in part on the second light outputs,
determine the desired spectrum of light reflected off of the surface based at least in part on the second spectrum of light reflected off of the surface, and
determine the first set of light source output values based at least in part on the desired light outputs for each of the plurality of light fixtures and the desired spectrum of light reflected off of the surface.

13. The lighting system of claim 12, further comprising a spectrometer configured to
detect the second light outputs for each of the plurality of light fixtures,
detect the second spectrum of light reflected off of the surface, and
transmit the second light outputs for each of the plurality of light fixtures and the second spectrum of light reflected off of the surface to the controller.

14. The lighting system of claim 8, wherein the controller is further configured to
determine a reproduction accuracy value for the plurality of light fixtures based at least in part on the first difference and the second difference.

15. A controller for a lighting system, the controller comprising:
an electronic processor and a computer readable medium, the computer readable medium including executable instructions capable of being retrieved from the computer readable medium and executed by the electronic processor to cause the controller to
drive light sources in each of a plurality of light fixtures at a first set of light source output values,
determine first light outputs for each of the plurality of light fixtures, each of the first light outputs having a first output spectrum,
determine a first spectrum of light reflected off of a surface, the light reflected off of the surface corresponding to light from the plurality of light fixtures,
determine a first difference between the first light outputs and desired light outputs for each of the plurality of light fixtures,
determine a second difference between the first spectrum of light reflected off of the surface and a desired spectrum of light reflected off of the surface,
calculate an updated output spectrum for the plurality of light fixtures based at least in part on the first difference and the second difference,
determine a second set of light source output values based at least in part on the updated output spectrum, and
drive the light sources in each of the plurality of light fixtures at the second set of light source output values.

16. The controller of claim 15, wherein the executable instructions further cause the controller to
receive the first light outputs for each of the plurality of light fixtures from a spectrometer, and
receive the first spectrum of light reflected off of the surface from the spectrometer.

17. The controller of claim 15, wherein the executable instructions further cause the controller to
receive spectrum data input, and
determine the first set of light source output values based at least in part on the spectrum data input.

18. The controller of claim 17, wherein the controller receives the spectrum data input from at least one source selected from a group consisting of a spectrometer, a user interface, and a light fixture.

19. The controller of claim 15, wherein, prior to driving the light sources in each of the plurality of light fixtures at the first set of light source output values, the executable instructions cause the controller to
- drive the light sources in each of the plurality of light fixtures at a third set of light source output values,
- determine second light outputs for each of the plurality of light fixtures, each of the second light outputs having a second output spectrum,
- determine a second spectrum of light reflected off of the surface,
- determine the desired light outputs for each of the plurality of light fixtures based at least in part on the second light outputs,
- determine the desired spectrum of light reflected off of the surface based at least in part on the second spectrum of light reflected off of the surface, and
- determine the first set of light source output values based at least in part on the desired light outputs for each of the plurality of light fixtures and the desired spectrum of light reflected off of the surface.

20. The controller of claim 15, wherein the executable instructions further cause the controller to
- determine a reproduction accuracy value for the plurality of light fixtures based at least in part on the first difference and the second difference.

* * * * *